United States Patent
Al Mohizea

(10) Patent No.: US 10,499,119 B2
(45) Date of Patent: Dec. 3, 2019

(54) SYSTEM AND METHOD TO VERIFY DATE AND LOCATION FOR THE CREATION OF A VIDEO

(71) Applicant: Saad Ibrahim Al Mohizea, Riyadh (SA)

(72) Inventor: Saad Ibrahim Al Mohizea, Riyadh (SA)

(*) Notice: Subject to any disclaimer, the term of this patent is extended or adjusted under 35 U.S.C. 154(b) by 154 days.

(21) Appl. No.: 15/645,811

(22) Filed: Jul. 10, 2017

(65) Prior Publication Data

US 2018/0048945 A1     Feb. 15, 2018

Related U.S. Application Data

(60) Provisional application No. 62/373,276, filed on Aug. 10, 2016.

(51) Int. Cl.
| | |
|---|---|
| *H04N 21/8358* | (2011.01) |
| *G11B 27/10* | (2006.01) |
| *H04N 1/32* | (2006.01) |
| *H04N 5/92* | (2006.01) |
| *H04N 21/435* | (2011.01) |
| *H04N 21/44* | (2011.01) |

(52) U.S. Cl.
CPC ......... *H04N 21/8358* (2013.01); *G11B 27/10* (2013.01); *H04N 1/32283* (2013.01); *H04N 5/9201* (2013.01); *H04N 21/435* (2013.01); *H04N 21/44008* (2013.01); *H04N 2201/3228* (2013.01); *H04N 2201/3235* (2013.01); *H04N 2201/3252* (2013.01); *H04N 2201/3253* (2013.01)

(58) Field of Classification Search
CPC .. H04N 21/8358; H04N 1/32283; H04N 5/91; H04N 5/9201; H04N 9/8205; H04N 21/435; H04N 21/44008; H04N 2201/3228; H04N 2201/3235; H04N 2201/3252; H04N 2201/3253; G11B 27/10
USPC ........................................................ 386/241
See application file for complete search history.

(56) References Cited

U.S. PATENT DOCUMENTS

| | | | |
|---|---|---|---|
| 2003/0011684 A1* | 1/2003 | Narayanaswami ... | G06T 1/0021 348/207.99 |
| 2003/0215110 A1* | 11/2003 | Rhoads ................. | G01C 11/00 382/100 |
| 2008/0288779 A1* | 11/2008 | Zhang .................. | G06F 21/645 713/178 |
| 2011/0167069 A1* | 7/2011 | Libich ................. | G06F 16/743 707/741 |
| 2015/0063776 A1* | 3/2015 | Ross ...................... | H04N 5/76 386/223 |

* cited by examiner

*Primary Examiner* — Thai Q Tran
*Assistant Examiner* — Nienru Yang

(57) ABSTRACT

A verification system includes: a code generation server publicizing time stamped codes; a proving device, including a video camera, that acquires a published time stamped code from the code generation server, and, while recording a video, incorporates the acquired time stamped code into the video; and a verifying device that receives the video, extracts the time stamped code from the content of the video, compares the time stamped code to published time stamped codes, and displays a verification of the published time stamped code.

13 Claims, 11 Drawing Sheets

SYSTEM AND METHOD TO VERIFY DATE AND LOCATION FOR THE CREATION OF A VIDEO

CROSS-REFERENCE TO RELATED APPLICATIONS

This application incorporates by reference and claims the benefit of priority to U.S. Provisional Patent Application No. 62/373,276, filed on Aug. 10, 2016.

BACKGROUND OF THE INVENTION

The present subject matter relates generally to file verification and authentication. More specifically, the present invention relates to a method and system to authenticate and verify the originality of a file.

The advent of compact cameras and camera-enabled mobile devices (e.g., smartphones, tablets) has vastly increased the number of video recordings and photographs that are uploaded to the Internet. Many of these videos and photographs include a timestamp, indicates the date and time the video or photograph was taken and a geotag, indicates the location the video or photograph was taken. Geotagging is possible if a camera-enabled device includes a Global Positioning System (GPS) receiver.

The timestamp and geotag may be electronically stamped in the video or itself, such that they are visible to anyone who views the video or photograph. Additionally, the timestamp and geotag may be located in metadata of the video or image file.

Timestamps and geotags are often used to authenticate and verify the originality of video or photograph. This authentication and verification ensures that the video or photograph was truly taken and created at the time and or location that the video or photograph displays or is presents in its metadata. The creator of a video or photograph can authenticate the file so that its originality can later be verified by anyone who views it.

However, timestamping and/or geotagging a video or photograph is not a foolproof method of authenticating the originality of the video or photograph. This is because a timestamp and geotag can be faked from the start, resulting in a false timestamp and geotag. For example, a user can adjust the settings of their camera to make it seem as though video or photograph was taken at a different time and location than it actually was. Additionally, metadata editor programs allow a user to modify a video or photographs timestamp and geotag.

Another common method used to authenticate the date and time of a video or photograph is to include a front page of a newspaper in the video or photograph. However, this method is not foolproof either because the appearance of the newspaper does not fully verify that the photograph was taken on that date. For example, if a particular newspaper is shown in the video or photograph, it means that the video or photograph was taken on the date of or after the newspaper date. Additionally, verification by showing a newspaper the user is not always possible because the creator may not have a newspaper to include in the video or photograph.

US2012/0183270 teaches a method for verifying that the user is human and not a machine by asking the user to make gestures while streaming live video, analyzing such complex movements might be difficult and an only be done manually with someone else on the other end verifying, furthermore it cannot be used for verifying date or location.

Proper video and photograph authentication and verification has many important use cases. One such use case in the event of a car accident. Often times, photographs of the accident are included with an insurance claim. Proper verification ensures that the photographs were taken at the time and location of the accident, thus helping to prevent insurance fraud.

Verification is also used to authenticate the originality of evidence in a criminal or civil trial. For example, if a surveillance video is being presented as evidence in a criminal trial to prove that the defendant committed the crime in question, the video authenticity of the video must be verified, including that the video was truly taken at the date and time.

Authentication is also important in journalism. Camera-enabled mobile devices have made it easier for even members of the public to take videos and photographs when they see newsworthy events, such as a criminal act or accident. These videos and photographs are often used by mainstream media sources when reporting on the story, and thus the verification of their originality is vital.

Accordingly, there is a need for a verification system that allows one to verify the originality of a computer file, particularly a video recording, including the date, time, and location the file was created, as described herein.

BRIEF SUMMARY OF THE INVENTION

To meet the needs described above and others, the present disclosure provides for a verification system that allows one to verify the originality of a computer file, particularly a video, including the date, time, and location the file was created.

By providing a system that allows one to authenticate the originality of a computer file the disclosed invention may give the public the ability to verify the date, time, and location a video was recorded by a camera-enabled device, including video cameras, still cameras, computers, and mobile devices (e.g., smart phones, tablets).

The verification system may allow a user to authenticate their photograph or video recording such that a viewer of the recording can later verify its originality, meaning that the viewer may verify that the video was in fact recorded at the date, time, and location that the creator of the photograph or video claims.

The verification system may allow a user to authenticate their video recording, by first, generating a time sensitive code and or location sensitive code. The time sensitive code may link to a particular date and time, while the location sensitive code may link to particular geographic location. The time sensitive code and location sensitive code may be incorporated into a single code, or be two separate codes, and may be a string of alphanumeric characters.

Upon generation, the verification system may then immediately broadcast the code. The code may be globally broadcasted and available to anyone who desires to authenticate their video recording. The verification system may also publish each code to a public database along with the codes respective timestamp, which may represent the date and time the code was generated and broadcast.

After the verification system broadcasts the code, the recording device may acquire the code. The recording device may acquire the code via an Internet connection, such by Wi-Fi or cellular connectivity. The recording device may also acquire the code via a radio or television broadcast.

After the recording device has acquired the code, the verification system, through a variety of methods, may automatically incorporate the code into the video recording. Alternatively, the verification system may give the user instructions on how to manually incorporate the code into the video recording. The code may be incorporated manually such that a user may view or hear the code on the screen or through speakers. The user then incorporates the code based on a predetermined instruction.

Once the code has been incorporated into the recording, the recording device may publish the recording, in whole or in part, a hash value of the recording, or a combination thereof, to a public log. The public log may be an Internet based website that is accessible to the public.

Once published to the public log, the video or hash value is publicly accessible and contain the date, time, and location the video or hash value was uploaded. It is preferred that the publication occur as soon as the code is incorporated into the file so that the timestamp of the upload be as close to the time that the code was generated and broadcast. The less lag time between code generation and publication, the more verifiable the recording is because the user had limited time to modify the original recording, including its original timestamp and geotag.

The viewer may then calculate the code from the recording. Next, to verify the originality of the recording, the viewer may match the code's timestamp with the publication timestamp (i.e. date and time the video or hash value was uploaded to the public log). The closer in date and time that the code's timestamp and publication timestamp are, the more likely the recording is original and unmodified because the user had minimal time to modify the recording.

The verification system may minimize the time between code acquisition, code incorporation, and publication such that there is minimal difference between the timestamp in the video and timestamp in the public log.

The time-sensitive code and location-sensitive code, which may be used to link a recorded video to its creation date, time, and location, may be a string of randomly generated alphanumeric characters. The code may include numbers, letters, or a combination thereof.

The codes are preferably random, unpredictable, and should be accessible to any user to acquire and incorporate into their video recording. The codes may also be free from bias and uncontrollable by anyone. A computer or server may randomly generate the codes. Further, the codes may be generated and broadcast at prearranged intervals, such as every minute. It is preferred that codes be broadcast more frequently because a large time gap between broadcast gives a user more time to modify their video recording.

The codes may be generated based on various weather parameters, such as temperate or humidity. It is preferred, that the weather parameters used to generate the random codes should be available for anyone to measure and yield the same result when measured by multiple people. It is also preferred that the parameters have enough variability in relation to time to generate unique random numbers.

Live satellite images of the Earth may also be used to generate codes. To generate a code, a screen shot may be taken of the satellite image at predetermined intervals, such as every minute. The image may then be represented by a string of alphanumeric characters, for example, by hashing the image and generating a hash value. This hash value may be immediately broadcast and/or published for the public to view and represents the code for that particular date and time.

It is preferred that the process of hashing and publication repeat itself at the beginning of each time interval, such as every minute. Broadcasting and publishing a new code every minute makes it much less likely that video can be faked or modified before being published to the public log. For example, if a video is published more than one minute after the code was broadcast, a viewer may become suspicious as to the authenticity of the date, time, and location of the recording.

The satellite image may also be broken down into pixels, wherein a binary number, which may be calculated by analyzing the color and brightness of the pixel, may represent each pixel. For example, the satellite image may be represented by a string of "0s" and "1s." Additionally, the instructions for such calculation may be present in the device itself, or in a distant server.

Astronomical images, including cosmic planets, the moon, or the sun may also be used for code generation. The physical attributes for cosmic events or plants may be measured and used to generate a code of random alphanumeric codes. Additionally, Earth's seismic activity, solar radiation measurements, magnetic force, or physical and atmospheric noise can all be used to generate random codes.

Another code generation method includes the use of man-made events that rely on multiple factors. For example, stock market indices, such as the Dow Jones Industrial Average, or the sum of multiple indices, can be used to generate random codes.

The verification system may include a feature wherein if, in the rare circumstance, the next code to be generated is equivalent to the previous code, a formula is used to change the value of the new code such that it is not identical to a previous code. The change may be predetermined or randomized. This ensures that each time interval is represented by a different code.

The database of codes, which includes a list of broadcasted codes along with their respective timestamp, is made public. Preferably the process by which these codes are generated is autonomous and free from human bias such as codes generated from physical attributes of cosmic events, this limits bias and makes the codes more trustworthy. As a result, for the verification system, a decentralized independent party organizes the codes, makes a public log of them and makes sure the codes are broadcast as they are being generated. If the codes are not made public, or if the codes are made by the party according to their own private algorithm, then the integrity of that party may be called into question.

The codes can be published in many ways, for example, on an Internet based website so that any member of the public can incorporate a broadcasted code to its timestamp and geotag. Publishing the codes into the public domain strengthens the verification process and authenticity of a file because they behave as universal a timestamp.

Further, it is also preferred that codes be publicly broadcast over the Internet via one or more websites because it makes the codes readily and easily available for all of the public to access. Other broadcast methods include radio, television, and cellular networks, including 3G and 4G based cellular networks.

After a random code is generated and made publicly available through broadcasting and publication, it may be acquired by the recording device, and incorporated into the video recording.

Upon being generated, it is preferred that the code be acquired by the recording device as soon as possible because code is only valid until the next code is published as part of the verification system. The code may be acquired from one or more websites that publicly broadcast each code as it is generated. Codes may also be acquired via a radio broadcast, television broadcast, or short message service. It is preferred that the recording device be used to acquire codes, for example, via an Internet connection. The recording device may also acquire new codes as they are published and/or broadcast even if the user is not recording a video at that time.

In a circumstance where the recording device is unable to connect to the Internet and acquire the code, or for extra privacy, the recording device may acquire the code from a secondary device. The secondary device may acquire the code via an Internet connection, radio broadcast, television broadcast, or short message service. The secondary device may transmit the code to the recording device via an ad hoc network, such as a Bluetooth network set up between the two devices. The secondary device may be a mobile device, such as a smartphone or tablet, or a desktop or laptop computer.

A code may be incorporated via manual or automatic means. In manual automatic code incorporation, the code may be detectable by a viewer through visual or audible means. The viewer may view the screen to obtain instructions on how to incorporate the code manually. The algorithm is made publicly available so that a standard way of receiving code, incorporating code and the method is agreed upon by the users.

In manual code incorporation, the user manually incorporates the code into the recording. A user may show the code to the camera or audibly announce the code such that a microphone present on the recording device picks up the announcement. The code may be displayed to the camera via a piece of paper or a secondary devices' display screen.

A user may also manually incorporate a code by moving the recording device in certain directions and/or shaking the device. Each direction and the distance or time traveled along the distance can signify a number to the viewer. Additionally, shaking the recording device, or other gestures, may be used to create a pattern. The number or code that each movement represents may be based on a predetermined algorithm that is publicly published such that any member of the public can calculate the alphanumeric value of an incorporated code from a recorded video.

After the code is acquired, a pattern is generated based on a predetermined and publicly available algorithm. The pattern may be displayed to the user via the device's screen, which may display instructions on how to move the device. Additionally, the device may give auditory instructions to the user on where and how to move the recording device.

For example, a code may be incorporated by following a certain path by moving the camera in one of four directions. First, an initial position is selected to serve as a reference point from where each movement will be detected. The initial position may be selected by shaking the device for a set period of time (e.g., 2 seconds). The display screen may then display instructions on where and how to move the device to input each number present in the code. Moving the phone left for 2 seconds may incorporate the number "7" while move the device in the same direction for 4 seconds may incorporate the number "4."

The instructions may be given as arrows on the display screen. A "right" arrow may mean that the user must move the device to the right, while a "left" arrow may mean the user must move the device to the left. For each instruction, the user will move the device in the instructed direction until the arrow disappears from the screen. The length of time that the arrow stays on the screen is equivalent to the length of time needed to incorporate the designated number. For example, if the number "7" is incorporated by moving the recording device left for 2 seconds, the display screen will display a left arrow. The left arrow will disappear from the screen once the user has moved the phone 2 seconds.

The previous incorporation method of moving the device may also be used to verify if the user of the device is human or robot.

In automatic code incorporation, the verification system automatically incorporates the code into the recording. Automatic code incorporation is preferred because it may speed up the incorporation of the code. Additionally, automatic code incorporation is preferred when intermittent or continuous code incorporation is employed.

Automatic code incorporation may involve the installation of a software program onto the recording device. The software program may include instructions and steps to allow the recording device to automatically incorporate a code into a recording. Alternatively, a remote server may send code incorporation instructions to the recording device.

In automatic code incorporation, the verification system may use one or more of the recording device's functions to produce a visual or audible change in the video recording, wherein the change incorporates the code into the recording. These functions or utilities, may be camera related, such as zoom or focus, or device related, such as the ability to play audio or vibrate.

In order for the verification system to automatically incorporate the code, the used function may need to be temporarily locked such that only the verification system can control it. The used feature may relay the code by producing specific visual or audible patterns within the recording. These patterns may be based on predefined published algorithms. The algorithms are made public so that any viewer, upon viewing the recording, may calculate the code, manually or automatically and therefore, verify the recording's authenticity.

A code may be automatically incorporated into a video recording via the recording device's camera's zoom feature. When the user begins to record a video, the recording device acquires the most recent code. The recording device may acquire the code via an Internet connection. After the code is acquired, the camera's zoom function may be locked such that the user cannot control it. At this point, the zoom function may be controlled only by the verification system, via a software program. The software program may be located locally on the recording device or remotely on a server. It is preferable for the user to fix the movement of the camera, for example, by holding the camera still or placing it on a tripod. The zoom function may then incorporate the code by a zooming in and out of the scene in predetermined pattern wherein each move represents part or all of the code.

When a code is incorporated via the camera's zoom function, the camera may first need to be calibrated because different cameras have different zooming capabilities. First, the scene may be zoomed from a maximum value to a minimum value (or vice versa). This sets the maximum and minimum zoom levels for the user's camera. The verification system may then calculate the distance from the maximum zoom level to the minimum zoom level and establish eight equidistant points between the maximum and minimum values, thus establishing a total of ten equidistant points along the entire zoom distance, with each point representing a number between zero and nine.

Upon acquiring a numeric code, the camera may zoom, in the same order as the code, to the equidistant points that represents each number in the code. For example, the minimum zoom point may represent 0, while the maximum zoom point may represent 9, with the additional eight equidistant points between the minimum point and maximum point representing the numbers 1 to 8. No number is represented more than once, and therefore, each number between 0 and 9 is represented. The camera may zoom and stay at each point for a designated time period (e.g., one second) before zooming to the next point that represents the following number in the code. Additionally, an arbitrary neutral position, other than the ten equidistant points, may be chosen anywhere in the zooming distance and used as an initial position before starting to incorporate the code into the recording.

In a circumstance that the code includes two equivalent digits in sequential order (e.g., in the code "85677" the number 7 occurs sequentially), the camera may zoom in or out just enough to leave a point, but not enough to arrive at an adjacent point. The camera may then zoom back to the previous point as to incorporate that number again. Alternatively, the camera may remain at that point for double the normal time.

Alternatively, after the camera's zoom is calibrated, the camera may be moved from its maximum zoom to its minimum zoom, stopping briefly at each eight various points along the way. These eight points, along with the maximum and minimum zoom levels create ten points along entire zooming distance, with each point representing a number between 0 and 9. No number is represented more than once, and therefore, each number between 0 and 9 is represented. The recording will visually show where each number is in the zooming distance. The camera may proceed to zoom and stay at each point for a designated time period (e.g., one second) before zooming to the next point that represents the following number in the code. In this method, a member of the public may calculate the code without the need of an algorithm because the formula is recorded within the video itself.

Alternatively, the speed or time spent while zooming can be used to incorporate codes. The speed by which the camera zooms from a neutral position, may signify a value, regardless of where it is on the zooming scale. One advantage of this incorporation method is that the zoom function does not need to be calibrated. likewise, the duration it takes while zooming (which is preferably in the range of less than one second) can signify a value based on a predetermined algorithm and used for incorporating code.

If the camera's zoom function is used to automatically incorporate codes into the recording, the verification system may be configured such that it alerts the user if the camera is moving during code incorporation, which might interfere with code calculation from the recording later and produce artifacts. The verification system may then automatically incorporate the more recent broadcasted code or instructs the user to perform another code incorporation. Motion sensors present in the recording device, such as gyroscopes and accelerometers, may detect this movement. The recording device may also detect movement if it recognizes an unexpected change in the axis of the recording.

A recording device's camera's flash function or other accessory lights (e.g., LED), may also be used to incorporate a code into the video recording. The flash or accessory light may be turned on and off repeatedly in a successive pattern such that it can be captured by the video. The pattern may be based on a predetermined algorithm that is publicly published such that any member of the public can calculate the code from a recorded video and verify its authenticity.

Additionally, the light source may also be implemented as a ring structure around the lens such that it is viewable in the recording. For example, the ring may turn on and off in a predetermined, publicly available pattern. Alternatively, the ring may change colors, wherein each color represents a different number. A key for what number each color represents may be publicly available so that a viewer can calculate the code.

The focus feature of a camera may also be used to incorporate a code into a video recording. First, the camera may need to be calibrated against a fixed object. When the object is sharp, a reference point is created and focusing away from that point in either direction can convey numbers to incorporate the code into the recording. Each digit may be given as a frame focused at some point, which can then be compared to the frame taken previously during calibration.

Alternatively, the systems and methods can utilize the changing of the focus parameters at a predetermined time intervals corresponding to specific time stamp codes. To better appreciate the focus changes in the recording, each change can be done in two opposite directions which facilitates recognizing this as code and not related to automatic focus recalibration due to change in the scene or position of the camera. Preferably such a change should be as subtle as possible so that it doesn't interfere with the recording.

In the event that a device has two lenses facing the same direction, one lens may be used for filming while the other lens may be used to incorporate the code. This may serve to minimize, or even eliminate any interference or delays with the recording because the second lens is being used to incorporate the code while the first lens is recording the video. Additionally, this allows for codes to be continuously incorporated into the video without interrupting the video recording, further increasing the confidence in the authenticity of the recording.

If an automatic method is used to incorporate the code, the verification system may be configured to reverse calculate the code from the pattern recorded in the video. A remote server, or a software program present on the device, can compare the incorporated code to the actual code to ensure the code has been incorporated correctly. The same algorithm used to incorporate the code may be used to calculate the code from the video. Additionally, the algorithm may be publicly published so that any member of the public may calculate a code from a video.

Another exemplary method for a verification system includes the use of a device having two lenses, otherwise known as a dual lens camera, where a first lens is fixed and can only move when the whole device moves and a second lens capable of movement. Preferably, the first lens is used for high quality video taking. The second lens, is movable by robotic arms and can move in all four directions. Movement of a lens without moving the device itself has been accomplished and extensively described in prior publications, one example are the cameras sold under the trade name PTZ cameras from Axis® Communication. Movement of the lens when the whole device is held still can be used to incorporate a code into the recording. Instead of manual movement, the movement of the lens is automated, freeing the user to concentrate on the scene filming with the first lens. Understandably, there is no need to show the user the directions, but instead, a pattern of movement is given for the robotic arms to move the second lens in the instructed pattern while both lenses are filming simultaneously. In the case that there is lot of movement in the device while recording, and since this might interfere in incorporating code, a small rod can be fixed to the device and in front of the moving lens, so that the rod doesn't move, even when the lens moves. The rod works as a reference point for the moving lens and therefore the code can be calculated precisely, even if the whole device moves. The rod should be as small as possible, preferably thinner than 3 mm, and as short as possible (1 mm beyond the border of the view field) and around 1 to 2 cm in front of the lens, so that it doesn't interfere with the recording. The device can be configured not to refocus based on the closely placed rod. Moreover, the rod can be configured to emit light if video is taken at night.

The previous embodiment can also work on devices with one camera, but it might be disruptive to filming. Moreover, in the previous embodiment, one device was described having two lenses, but two devices, each having a lens, can be used if aimed constantly at the same scene. If using two lenses, one lens might function as a reference for the other lens. A comparison can be made between the zooming distances of the lenses, especially when the whole device is moving.

One advantage of using a method of automated code incorporation is that if a camera is left to record, the camera can be still verified as long as code is incorporated and published. This is especially useful for surveillance cameras which are usually fixed and left to film and for other similar cameras such as spy cameras, drone cameras, and when a user fears for his safety and leaves the camera in the scene to film.

Another method for a verification system employs the vibration utility of the device. In this embodiment, the rate, duration, intensity and pattern of the vibration can all be used in relaying a code into the recording similar to previous embodiments. The time at which each vibration event is presented and the relation to other events can also be used to relay code in intermittent or continuous code incorporation.

While it is preferred that a code be incorporated at the beginning of the recording, it may be possible to incorporate a code later in a recording. A manual or automatic method may be used to incorporate a code at any time into a recording.

In order to verify the entirety of a recording when a code has been incorporated into just a portion of it, the recording may need to be continuous without any interruption. This is because only the continuous parts adjacent to a verified clip having the incorporated code may be verified.

The verification system may include an alert system that can recognize if a video has been interrupted. If an interruption is encountered, the user may be alerted that the recording has been interrupted. The user may be alerted via visual, tactile, or verbal means. The user may then be instructed to acquire and incorporate the most recent broadcasted code. If the user has opted for automatic incorporation, the recording device may automatically acquire and incorporate the most recent broadcasted code.

Conditions that trigger an interruption may generally depend on the scene itself, but generally, an interruption may be an actual stoppage in the recording, or the appearance of highly overexposed or underexposed scene meant to hide the fact that the video has been interrupted. The verification system may include a threshold level for when an overexposed and underexposed scene trigger an interruption. For example, an overexposure may occur if the user directs the camera towards a bright light, such as the sun. In such case, the recording itself will be continuous, but the verification system may nonetheless detect an interruption and acquire and incorporate the most recent broadcast code. Alternatively, if the user opts to incorporate the code manually, the verification system may instruct the user to incorporate the most recent broadcast code.

The verification system may also detect an interruption if the scene moves so fast that the scene cannot be recognized because of a rapid movement by the device. Motion sensors, such as gyroscopes and accelerometers may be used to gauge the position of the recording device and detect an interruption.

Intermittent or continuous code incorporation may be used, thus leading to a higher level of verification. In intermittent verification, a code may be incorporated more than one time while the video is being recorded. This may be done at random or fixed time intervals. The time intervals are equal or larger than the time intervals for broadcasting new codes.

In continuous code incorporation, codes are continuously incorporated into the video as it is being recorded. Continuous code incorporation may offer the highest level of verification potential because it would be nearly impossible to fake the recording. This is because there are little to no gaps between the codes, and an interruption, even if it occurs, offers very minimal time for a user to modify the recording. Preferably, in continuous code incorporation, there should be minimal lag time between code generation and acquirement, so that each new code can be incorporated.

In the event that a user opts to use intermittent or continuous code incorporation, it is preferred that the user incorporate codes via an automatic method that does not disrupt the recording. For example, the incorporation methods of zooming or focusing may distort the image, even momentarily. Methods that do not distort the image, such as using a dual lens camera or lighted ring structure around the lens, are alternatives.

Automatic code incorporation may be done into a video stream while the video is synchronized with a standard time. Time synchronization may narrow the time from code acquirement to publication, making it more difficult for a user to fake, split, or merge old videos.

The standard time may be any universal, publicly available time standard, including Coordinated Universal Time (UTC), Network Time Protocol (NTP), International Atomic Time (TAI), or Global Positioning System (GPS) time. The code may be incorporated immediately upon acquirement and coincide with the time that the code was broadcast. The verification system may later correct any lag time that occurs because of the time it takes to incorporate the most recent code.

The verification system may acquire a universal time to synchronize it with video recording time. When a user begins a recording, the verification system may incorporate the universal time into the video, and then relate the recording to that particular time. A reference time point in the recording may be chosen from which recording time can be measured. The recording device, via an automatic code incorporation method, may mark the reference point by incorporating a code that carries the universal time at that moment. Alternatively, the reference point may be signed digitally or watermarked.

Next, the recording device may incorporate the next code to be broadcast into the video stream, with the recording time easily calculated from the reference point. If the user opts for intermittent or continuous code incorporation, the recording device may incorporate new codes as they are broadcast. In order to better facilitate time synchronization, it is preferred that a frame rate between 28 to 30 frames per second be used.

If the recording device includes a Global Positioning System (GPS) receiver, the user may also incorporate location information into the video recording. Each GPS satellite transmits ephemeris data, which provides information about its orbit and location. A GPS receiver uses the ephemeris data to calculate its location relative to the satellites, and thus, position on Earth. In order for a GPS receiver to calculate its position in it needs to be able to receive signals, which contains ephemeris data, from at least three GPS satellites. However, four satellites will provide a much more accurate position. Some parts of the Ephemeris data is hard to predict before broadcasting, such as the value for the health of the satellite and thus, can be used as unique random codes for date, time, and location stamping. GPS determination is time sensitive, and therefore, time synchronization can be used to incorporate the location data by displaying when the GPS signal was acquired and then incorporating it along with the synchronized time frame.

A recording device with a GPS receiver may instantly incorporate ephemeris data into the recording as the data is broadcast. Because some of the ephemeris data is random, it can be used as proof that the video recording was in fact recorded on that date, on that time, and at the particular location.

From the ephemeris data, one can calculate the date, time, and location the video was recorded. If the recording device is able to incorporate ephemeris data from any known methods, such as a GPS receiver, from at least three GPS satellites a precise location can be determined. Via triangulation, the verification system can use the ephemeris data to calculate the location the recording was shot. Furthermore, the viewer can determine the timestamp of the ephemeris data via a public log to verify the authenticity of the video recordings timestamp.

While it is preferred that codes be incorporated into the recording itself, codes may also be incorporated into the recording file's metadata. However, metadata incorporation is not as secure because metadata can be easily manipulated.

After one or more codes have been incorporated into a video recording, the whole recording, part of the recording, or a hash value of the recording is immediately published in a public log such that any member of the public can view the recording or hash value and verify its time, date, and location data. The recording or hash value may be uploaded from the recording device to the public log via an Internet connection.

Once a recording has been published, any viewer of the recording may authenticate the recording by first obtaining the publicly available algorithm that was used to incorporate one or more codes into the recording. The viewer may then use that algorithm to calculate all the codes that are incorporated into that recording. Once the code (or codes) is obtained, the viewer may use a publicly available database to match each code to its corresponding timestamp and/or geotag. If the code's timestamp matches the date and time that the recording was published, then the date and time that the video was recorded can be verified. Additionally, if the code's geotag matches the location that the recording was published, the location that the video was recorded may be verified. This is because some of the ephemeris data contain random numbers that are nearly impossible to predict such as those relating to the health of a satellite, especially when they are first broadcast (some ephemeris data once updated remain the same for some time before they get updated) and these can be used as reference point for time and location.

In partial publication, only part of the video is published and code incorporation may be done as the video is recorded. At least one part of the published portion should contain at least one incorporated code for later verification. If the video is continuous without any interruptions, Partial video publication offers privacy to the publisher because only part of the video is published with the main parts deliberately kept secret, but still preserves the potential to authenticate the entire original video should the publisher wish to publish the entire recording.

Selective columns and rows may be cropped from each video frame, and only these cropped frames are published. The select columns and rows that are published are known as "blocks" and the process of selecting them is known as "reduction." The length and width of each column or row can vary in size, such as one pixel to five pixels wide.

Reduction may be done in a random manner and the percentage of published video to unpublished video may vary, for example, one user may opt to publish 25% of their recording, while a second user may opt to publish 75% of their recording. The more of a recording that is published, the more verifiable it is, but the less private it is. Thus, each user must decide the balance of verifiability and privacy they wish to achieve.

If the recording is a continuum of frames (i.e. no break points in the recording), a viewer may verify the rest of the recording if it's adjacent to the frames containing the incorporated code.

As an alternative to publishing the video recording, a user may instead publish a hash value of the recording. Because one or more codes have been incorporated into the recording, the hash value of the recording contains code information. The hash value is collision resistant, and therefore, only that untampered original recording can be the result for that particular hash value, and therefore, the recording can be verified even if the recording itself is not published. Instructions for how to hash the recording may be on the recording device or a remote server. Preferably, hashing is done on the recording device because it is faster than hashing on a remote server. Hashing may be accomplished by a variety of methods, such as the MD5 algorithm, which produces a 128-bit hash value. For faster hashing, a reduced size of the video recording can be used.

When a video is being recorded, a hash value may be calculated either at different time intervals or at the end of the recording. In the case where hash values are calculated at different time intervals, hash values may be calculated for different clips as the video is being recorded. Each clip is labeled with the start time and end time of the recording and embedded into the clip's hash value. Upon creation, each hash value is immediately published with a timestamp and/or geotag, and therefore, can be used to verify the originality of the recording. The user may later publish the recording itself and refer viewers to the public log containing the recording's hash values.

It is preferred that the location of the public log be universal and available to the public, for example, the world wide web, newspapers, televisions, and radios are potential examples. However, Internet publication is preferred because it is the most accessible location. Additionally, the location should be safe from tampering. In one embodiment, the location of publication may occur one a plurality of websites. if hashed, the video can be verified at any time without disclosing an actual clip for it, and the user can always publish it later if he wishes so.

The disclosed verification system may also be used to authenticate photographs. After code acquisition, the camera-enabled device may insert the code as a digital signature or watermark. Additionally, the user may display the code in the photograph itself, such as by including a paper with the code in the photograph. The previously mentioned methods of publishing recordings and hash values are also applicable to publishing a photograph. The photo may be published in whole, or in part, just as long as the incorporated code is visible. Additionally, a hash value of the photograph may be created and published. This however, offers lower verification power than for videos since successive codes cant be dynamically incorporated like in videos.

The verification system may use the same or similar method it uses for video verification to authenticate music files. In a music file, a code may be incorporated as a digital signature or watermark. Alternatively, the code may also be verbalized and recorded into the music file itself.

The verification system may also be used to verify one's identity. For example, website, such as a bank, may take a quick live video recording of the user at a distant location other than the bank's, while attempting to log into an account. The verification system may verify the date and location of the recording, and thus verify the authenticity of the recording. For example, if the location is found to be other than the user's preregistered locations (e.g., home, office), the system may trigger an alert and the user is denied access.

Proof of authorship and proof of creation can be used to protect the rights of the creator of a file, since the author can always prove he is the first to create an original file. If the video contains footage of the user himself, this further strengthens the claims that he is the author. Even if the video is widely published in the public domain, the user can still claim rights to the file since he can also prove it was original by examining the incorporated code and no one can produce an earlier version than what is in the date stamp. Counterfeit copies will always be published with a later time stamp and, therefore, can be easily refuted based on the date in the incorporated code that is part of the video. In this example, there is no need for passcodes to protect the video. If the user prefers to not publish his work, but would like to have the option to prove he created it some later point in time, then a hash value may be produced (as described above) and only the hash value is published for future references.

For example, a person may use the verification system for proving he shot an original video of a crime committed, he publishes the video in its entirety in the public log date stamped and geo stamped by the incorporating the time sensitive code using the verification service. So, since he created the video around the same time it got published, any later claims, modified or not, can be easily refuted as being not original just by looking at the date of the upload or publishing of the copy which will always be later than the true original video. Even though his video is published in a specific log, he retains the right for copyright and publishing in other public domains such as other websites or television.

The verification system may also be used to incorporate the name of the author of the video recording into the recording. The same code incorporation methods may be used, but in addition to the timestamp or geotag codes, another code relays the author's name. Additionally, the name of the author may be written on a piece of paper and recorded into the video manually.

In one embodiment, a verification system includes: a code generation server publicizing time stamped codes; a proving device, including a video camera, that acquires a published time stamped code from the code generation server, and, while recording a video, incorporates the acquired time stamped code into the video; and a verifying system that receives the video, extracts the time stamped code from the content of the video, compares the time stamped code to published time stamped codes, and displays a verification of the published time stamped code.

In another example, a method for verifying a recording includes the steps of: generating a series of time stamped codes using a code generation server; publicizing the series of time stamped codes; recording a video in a proving device; acquiring a published time stamped code in the proving device; incorporating the acquired time stamped code into the video; receiving the video including the time stamped code in a verifying device; and extracting the time stamped code from the content of the video. In some embodiments, the method further includes comparing the time stamped code to published time stamped codes; and displaying a verification result of the published time stamped code.

The verifying device is typically embodied in a remote server. However, it is contemplated that the verifying device may be any hardware providing a website, application, or other mechanism by which the verification described herein may be completed.

In other examples, the proving device further determines a series of motions, each motion derived from a digit of the time stamped code, and prompts a user of the proving device to move the video camera through the series of motions using a user interface of the proving device. In other examples, the proving device determines a series of zoom positions, each zoom position corresponding to a digit of the time stamped code, and, while the video camera is actively recording, updating a zoom function of a camera lens of the camera according to the series of zoom positions. In some versions, the proving device determines a series of zoom positions, each zoom position corresponding to a digit of a base numeric system, and, while the video camera is actively recording, updating a zoom function of a camera lens of the camera according to the series of zoom positions. In still other examples, the video camera moves through the series of zoom positions from a maximum zoom to a minimum zoom, stopping at each of eight points between the maximum zoom and the minimum zoom. In some examples, the speed at which zooming is performed signifies a particular code or value. In other examples, the duration of zooming determines a specific predetermined time stamped code. In further examples, the video camera includes two lenses including a first lens and a second lens and the first lens records the video while the second lens incorporates the acquired time stamped code into the video.

In another example, a method for verifying a recording is a live recording includes the steps of: recording a video with a video camera in a proving device, the proving device including a first function that imparts an observable change to the recording characteristics; communicating the video to a verifying device; controlling the first function through the verifying device to impart an observable change in the video communicated to the verifying device; and confirming, in the video communicated to the verifying device, that the first function effects occurred in response to the control by the verifying device.

In some examples, the first function that imparts an observable change to the recording characteristics is a zoom function. In other examples, the first function that imparts an observable change to the recording characteristics impart an audible change. In yet another example, the first function that imparts an observable change to the recording characteristics impart a visual change. In some embodiments, the first function cannot be controlled by the proving device. In still other examples, the step of confirming that the first function effects occurred in response to the control by the verifying device is performed automatically by the verifying device.

In yet another embodiment, a verification system includes: a code generation server publicizing ephemeris codes; and a proving device, including a video camera, such as a smart phone or a tablet, that acquires a published ephemeris code from the code generation server, and, while recording a video, incorporates the acquired ephemeris code into the video. In some examples, the verification system further includes a verifying device that receives the video, extracts the ephemeris code from the content of the video, compares the ephemeris code to published ephemeris codes, and displays a verification of the published ephemeris code. In some versions, only a portion of the video into which the ephemeris code is incorporated is publicly published. In other versions at least a part of the video (and potentially all of the video) is first hashed and then publicly published.

To verify the entirety of a recording after incorporating a code into just a portion of the recording requires that the recording is continuous, i.e., without interruptions. Only the continuous parts adjacent to a verified clip including the incorporated code can be verified. Interruptions that disrupt verification can be real interruptions, such as stopping the recording and resuming again. In other examples, an interruption can be identified when the surroundings of the screen impose an interruption as the case with lights going off unexpectedly. Interruptions can also happen when the camera is moved fast or blocked by a hand or object. Each of these examples can be accidental or even induced to fake a video and/or to artificially combine two videos that were not created at the same time by taking advantage of these vulnerable interrupted portions of the video. Likewise, even if a code is incorporated at the beginning of the recording, an interruption calls into question the authenticity of the recording. Accordingly, it is contemplated that the code can only be used for verification from its inception until the end of the recording (if not interrupted) or until an interruption in the recording occurs. For this reason, it is crucial to recognize interruptions and alert the user or automatically acquire a new code while the user is recording. Ideally, the whole video is continuously coded so that there is no chance for faking. However, continuous coding might interfere with recording itself, especially if only one lens is used.

It is presumed that, if not interpreted, a video is a continuum of frames that are exceedingly hard to manipulate, unlike still photos. Therefore, if any part of a video recording is verified by date stamping at any frame between the beginning to the end, and if there were no interruptions, the whole video can be safely labeled as verified by the verification service. To this effect, instructions can be given to the user to film in good light, stay away from very bright or dark scenes, avoid shaking or moving the device forcibly or blocking the view, and move slowly when aiming to a different direction. However, filming at night or running away from a dangerous scene are conditions in which interruptions might happen with higher frequency, even when using technologies that produce image stabilization. Therefore, continuous coding, or intermittent coding can be implemented to assist in solving the problem described herein. It is also understood that a wide lens camera will better handle sudden movements by the user and take smoother shots, which makes a recording from a wider lens camera easier to validate.

In a further example, a verification system includes: a code generation server publicizing time stamped codes; and a proving device, including a video camera, that acquires a published time stamped code from the code generation server, and, while recording a video, incorporates the acquired time stamped code into the video according to a published algorithm. The verification system may further include a verifying device that receives the video, extracts the time stamped code from the content of the video, compares the extracted time stamped code to published time stamped codes, and displays a verification of the recorded video.

The code generation server may derive the time stamped code from weather parameters. The code generation server may derive the time stamped code from a price of a stock index. The proving device may further determine a series of motions, each motion derived from a digit of the time stamped code, and prompt a user of the proving device to move the video camera through the series of motions using a user interface of the proving device.

In some instances, the proving device determines a series of zoom positions, each zoom position corresponding to a digit of the time stamped code, and, while the video camera is actively recording, updates a zoom function of a camera lens of the camera according to the series of zoom positions. In some instances, the proving device determines a series of zoom positions, each zoom position corresponding to a digit of a base numeric system, and, while the video camera is actively recording, updates a zoom function of a camera lens of the camera according to the series of zoom positions. In some embodiments, the video camera moves through the series of zoom positions from a maximum zoom to a minimum zoom, stopping at each of eight points between the maximum zoom and the minimum zoom. The speed at which zooming is performed may signify a particular code or value. The duration of zooming may determine a specific predetermined time stamped code.

In some embodiments, the video camera includes two lenses including a first lens and a second lens. The first lens can be used to record the video while the second lens incorporates the acquired time stamped code into the video.

At least a portion of the video into which the time stamped code is incorporated may be publicly published. At least a portion of the video may be first hashed and then publicly published.

In yet another embodiment, a method for verifying a recording includes the steps of: generating a series of time stamped codes using a code generation server; publicizing the series of time stamped codes; recording a video in a proving device; acquiring a published time stamped code in the proving device; incorporating the acquired time stamped code into the video according to published algorithm; receiving the video including the time stamped code in a verifying device; and extracting the time stamped code from the content of the video. The method may further include the steps of: comparing the acquired time stamped code to published time stamped codes; and displaying a verification of the video.

In still another embodiment, a method for verifying a live recording includes the steps of: recording a video with a video camera in a proving device, the proving device including a first function that imparts an observable change to the recording characteristics; communicating the video to a verifying device; controlling the first function through the verifying device to impart an observable change in the video communicated to the verifying device; and confirming, in the video communicated to the verifying device, that the first function effects occurred in response to the control by the verifying device. In some versions, the first function that imparts an observable change to the recording characteristics is a zoom function. In other versions, the first function that imparts an observable change to the recording characteristics impart an audible change. The first function that imparts an observable change to the recording characteristics may impart a visual change. The first function may not be controlled by the proving device. The step of confirming that the first function effects occurred in response to the control by the verifying device may be performed automatically by the verifying device.

In another embodiment, a verification system includes: a code generation server publicizing ephemeris codes; and a proving device, including a video camera, that acquires a published ephemeris code from the code generation server, and, while recording a video, incorporates the acquired ephemeris code into the video according to predetermined algorithm. The verification system may further include a verifying device that receives the video, extracts the ephemeris code from the content of the video, compares the ephemeris code to published ephemeris codes, and displays a verification of the published ephemeris code. The verification system may publicly publish only a portion of the video into which the ephemeris code is incorporated. At least a part of the video may be first hashed and then publicly published. The incorporation of the acquired ephemeris code into the video may be continuous from the start of the recording to the end. The incorporation of the acquired ephemeris code into the video may be intermittent between the start of the recording to the end.

An objective of the disclosed system is to provide a file verification system wherein users can authenticate the originality, including the timestamp the geotag, of their files.

An objective of the disclosed system is to provide a file verification system wherein one can verify the originality of a file, ensuring that the file was in fact created at the date, time, and location as the file creator claims.

An advantage of the disclosed system is that the generated codes are random, free from bias, and uncontrollable by any member of the public.

Another advantage of the disclosed system is that the codes are publicly published so any member of the public can match a file's incorporated code to its associated timestamp and geotag.

Another advantage of the disclosed system is that codes must be generated every minute, making it exceedingly less likely that codes may be faked.

Another advantage of the disclosed system is that in an automatic code incorporation method, the algorithm used to incorporate the code is made publicly available such that any member of the public viewing the video may calculate the code.

Another advantage of the disclosed system is that codes may be incorporated into a file via manual or automatic methods.

Another advantage of the disclosed system is that codes may be incorporated into a video recording one time, intermittently, or continuously.

Another advantage of the disclosed system is that in an automatic code incorporation method, if a camera is left to film continuously, the recording may still be verified as long as the code is properly incorporated and published.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
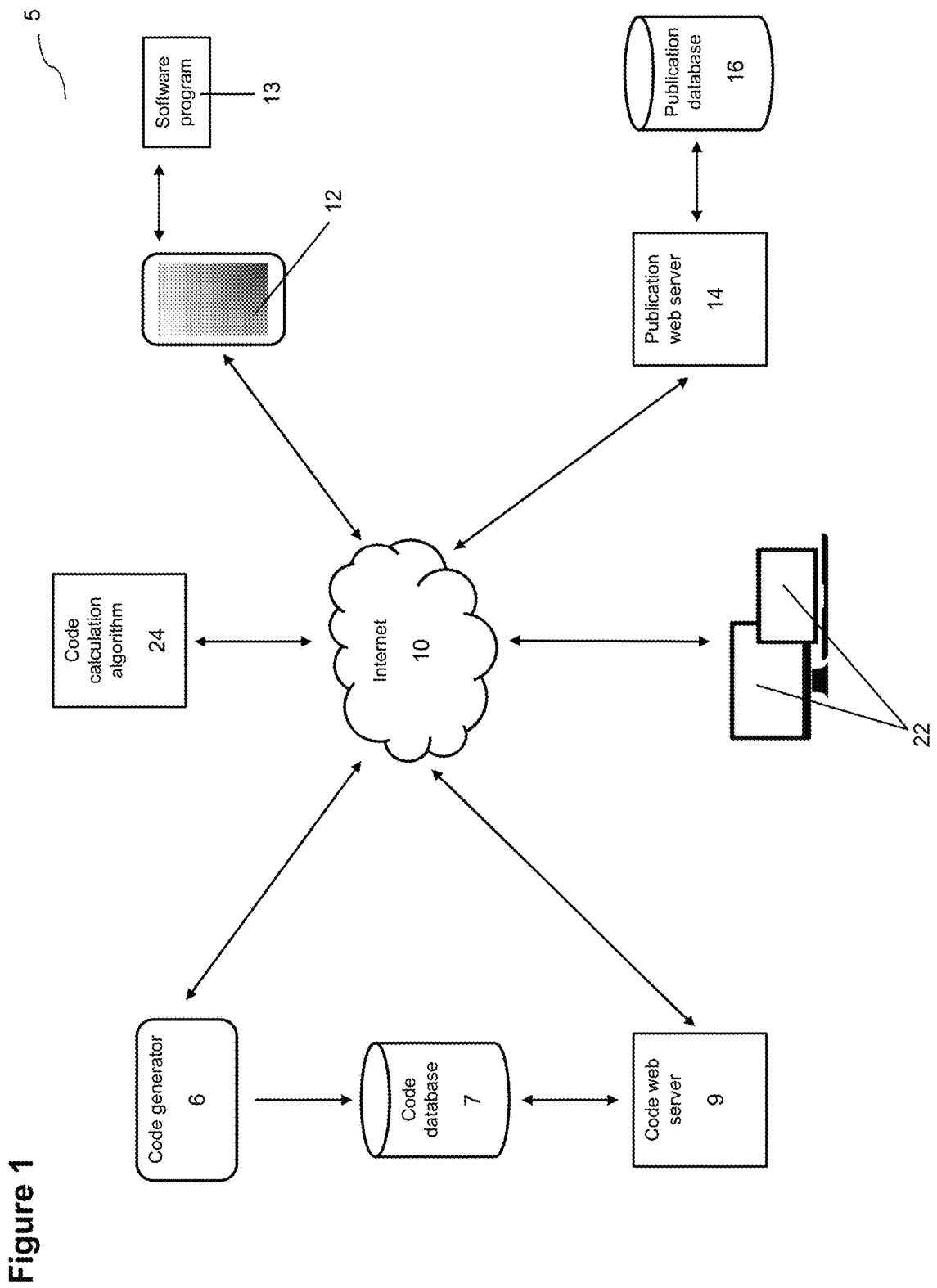
FIG. 1 is an exemplary schematic for a video verification system.

FIG. 1 illustrates an exemplary schematic for a video recording verification system 5. The code generator 6 may generate random codes that may be a string of alphanumeric characters. Upon generation, the code generator 6 may broadcast the code such that a recording device 12 may acquire it. The code generator 6 may broadcast the code via the Internet 10, a radio broadcast, or television broadcast.

After generation, code generator 6 may also upload the code to a code database 7. The code database 7 may store each code, along with its timestamp, which may indicate the data and time the code was generated and broadcasted. The code database 7 may be publicly accessible via a code web server 9.

After the recording device 12 acquires the code, the code may be incorporated into the video recording. The code may be incorporated via manual or automatic methods. A software program 13 that is installed on the recording device 12 may automatically incorporate the code. After the code has been incorporated into the video recording, the recording device 12 may publish the full recording, part of the recording, or a hash value of the recording to a publication web server 14 via the Internet 10. The web server 14 may be publicly accessible through an Internet based website. The publication web server 14 may store all published recordings and recording hash values in a publication database 15.

A viewer may verify the originality of a video recording by using a computer 22. The viewer views the recording to obtain the incorporated code and then uses the code calculation algorithm 24 to calculate the code. The viewer may gain access to the code calculation algorithm 24 through the Internet 10. After the viewer calculates the code, they may access, through the Internet 10, the code web server 9 to obtain the code's timestamp. To verify the recording's originality, the viewer may then compare the code's timestamp to the publication's upload timestamp. In manual methods, the calculation algorithm may contain instructions on how to incorporate the code into the recording, such as by verbalizing it into the microphone of the device or writing on a paper and showing it to the camera.

Figure 2:
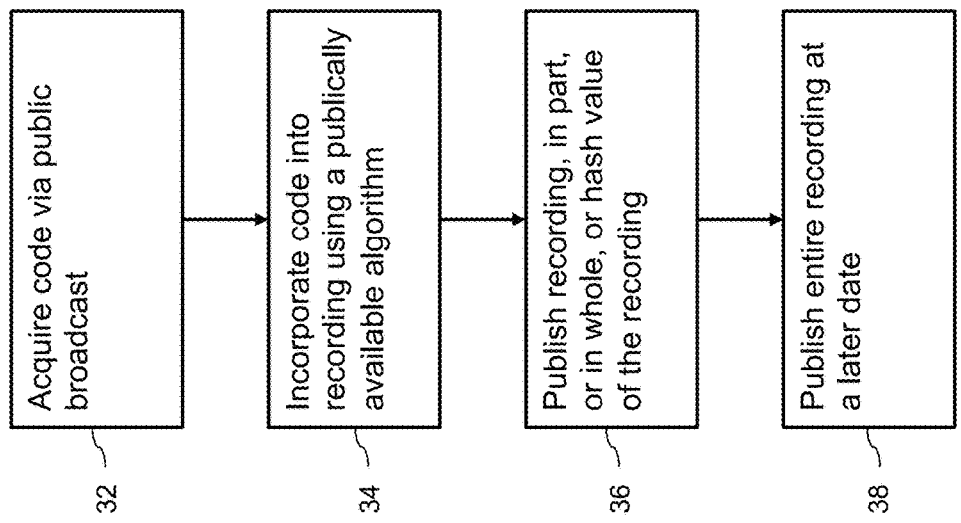
FIG. 2 is an exemplary flowchart on how a creator may use the verification system of FIG. 1 to authenticate their video recording.

FIG. 2 illustrates an exemplary flowchart on how a user may use the verification system 5 to authenticate their video recording. In step 32, the recording device 12 acquires the code via a public broadcast, such as an Internet based website, radio broadcast, or television broadcast. Next, at step 34, the verification system 5 may immediately incorporate the code via a manual or automatic method. The code may be incorporated via a publicly available algorithm. After code incorporation, at step 36, the verification system 5, at the user's discretion, may immediately publicly publish the recording, in whole, or in part, or a hash value of the recording, to a publicly available website. At step 38, the user may opt to publish the entire recording if not already done so at step 36. Because a portion of the recording, or the hash value, was published in step 36, the entire recording may be verified by verifying the publication from step 36.

Figure 3:
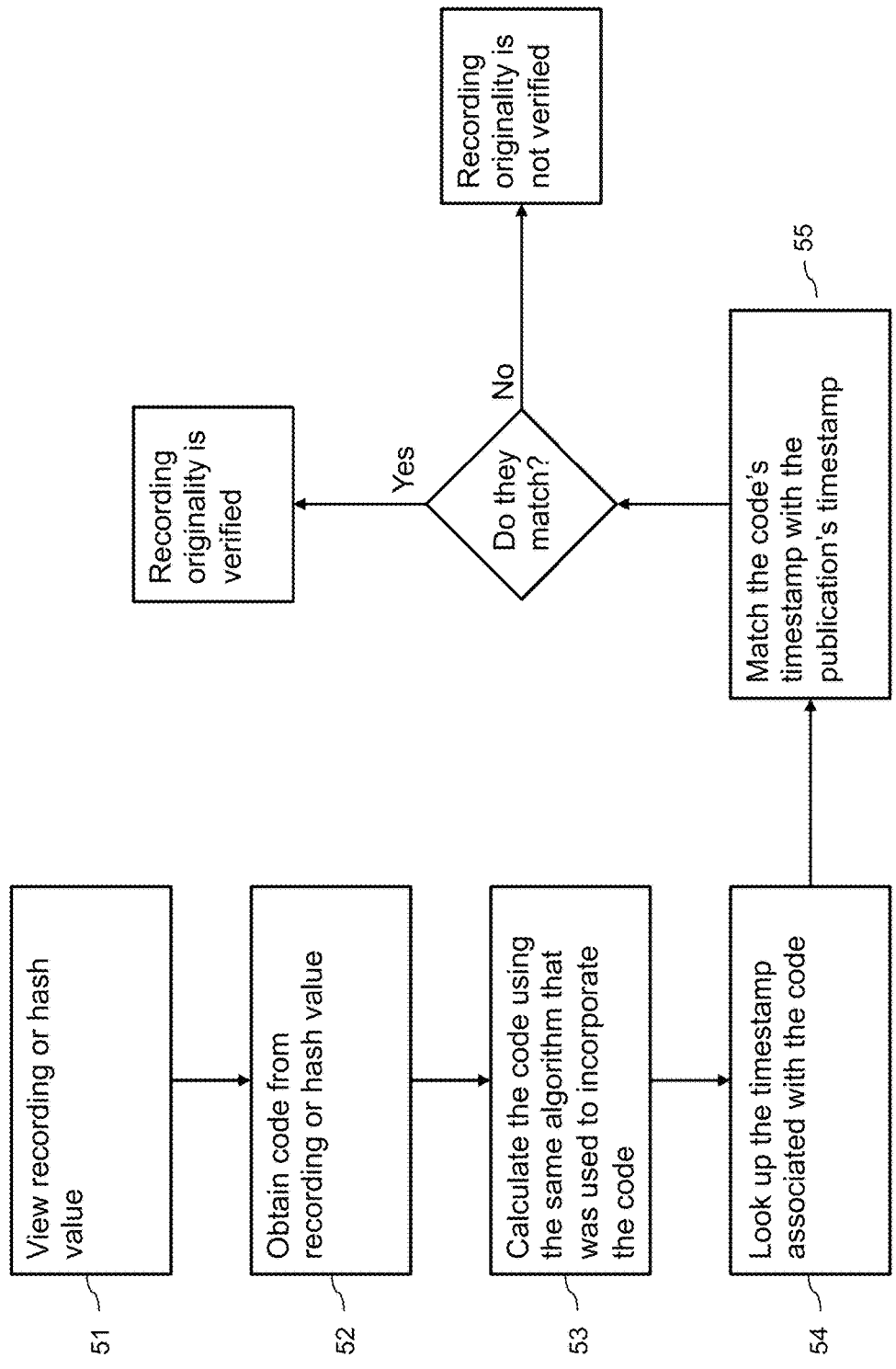
FIG. 3 is an exemplary flowchart on how a viewer of a video may use the verification system of FIG. 1 to verify its originality.

FIG. 3 illustrates an exemplary flowchart on how a viewer may use the verification system 5 to verify the originality of a recording. At step 51, the viewer views the published recording or its hash value. The published recording may be the entire original recording, or just a part of the original recording. At step 52, the viewer obtains the incorporated code from the recording or its hash value. The code may be a string of movements or scene changes.

NeXT, at step 53, the viewer calculates the code using the same algorithm that was used by the verification system 5 to incorporate the code. The calculation may be a string of alphanumeric characters. At step 54, via a publicly available database, the viewer obtains the code's timestamp, which may indicate the date and time the code was and broadcast. Next, at step 55, the viewer matches the code's timestamp with the publication's upload timestamp. If the timestamps match, the recording's originality is verified. If the codes do not match and there is a large gap between the timestamps, the originality of the publication may be questioned. this process can be automated by the verification system by reverse calculating the code from a recording.

Figure 4:
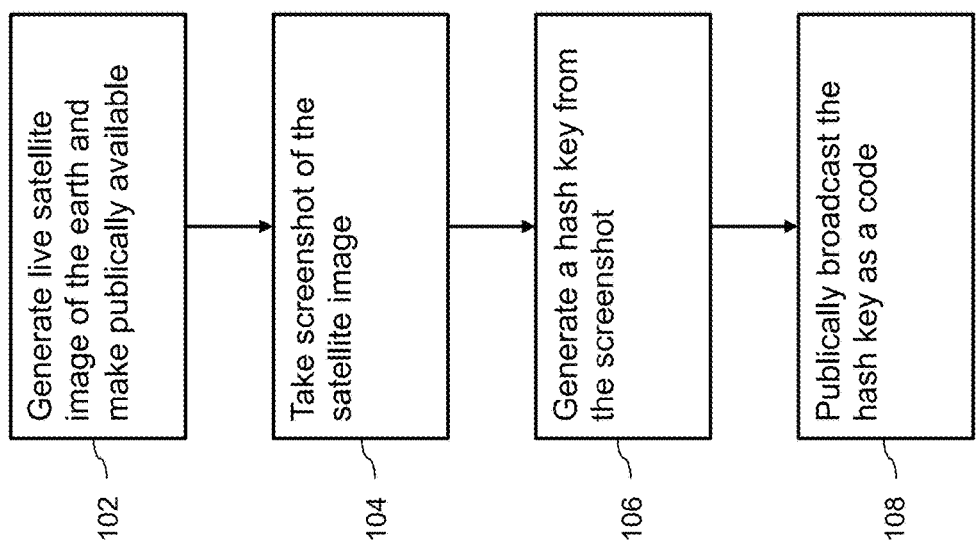
FIG. 4 is an exemplary flowchart on how the verification system of FIG. 1 may create a random code from a satellite image.

FIG. 4 illustrates an exemplary flowchart on how a code may be generated via a satellite image of the earth. At step 102, a live satellite image of the earth is generated. The image may be generated by the verification system 5 or a third-party. Next, at step 104, a screenshot is taken of the satellite image. The screenshot may be of the whole satellite image, or just a portion of the image. Additionally, the screenshot may be taken by the verification system 5, or a third-party.

Next, at step 106, the verification system 5, or a third-party, may generate a hash value from the screenshot in the previous step. At step 108, the hash value is publicly broadcast such that it may be acquired by a video recording device and incorporated into a video recording. The hash value may be broadcast via Internet, television, radio, or cellular means. Further, the hash value may be broadcast by the verification system 5 or a third-party.

Figure 5:
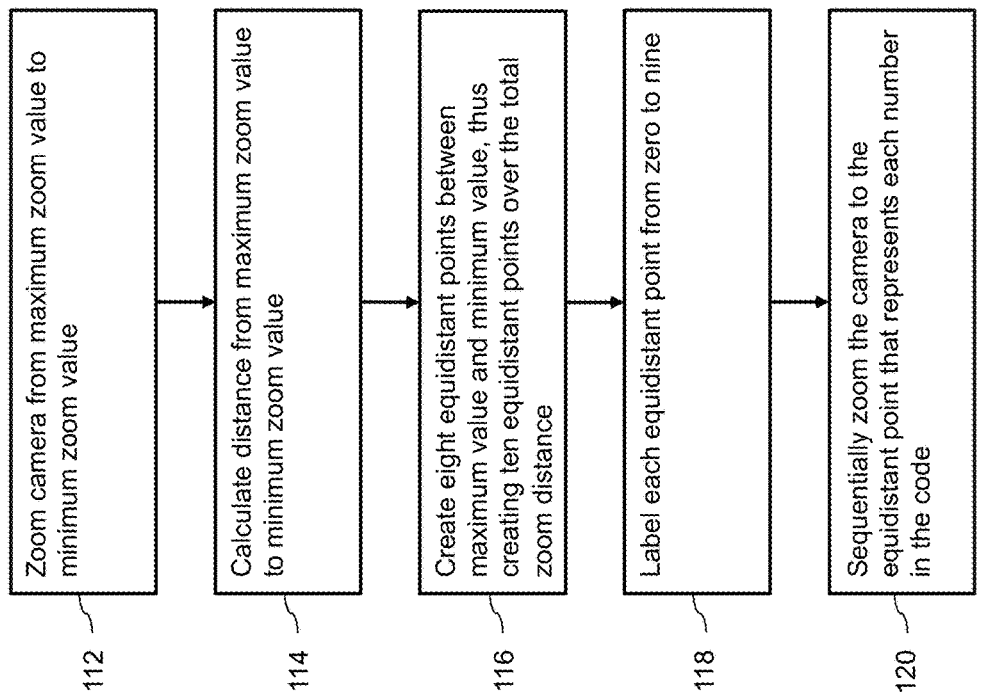
FIG. 5 is an exemplary flowchart on how the verification system of FIG. 1 may use the zoom function of a camera to incorporate a code into a video.

FIG. 5 illustrates an exemplary flowchart on how the verification system 5 may use the zoom function on a camera to incorporate the code into the video recording. At step 112, the camera may be zoomed from its maximum zoom level to its minimum zoom level. Next, at step 114, the verification system 5 may calculate the distance from the maximum zoom value to the minimum zoom value. At step 116, the verification system 5 may create eight equidistant points between the maximum zoom value and minimum zoom value, thus creating a total of ten equidistant points along the entire zoom distance. Next, at step 118, the verification system 5 may label each equidistant point from 0 to 9. The points may be labeled in a sequential manner (i.e., 1, 2, 3, 4 . . . ). At step 120, the zoom may be moved from one equidistant point to another equidistant point. Each point represents may represent a number in the code. To incorporate the code correctly, the zoom may be moved from point to point in the same order as the numbers appear in the code.

Figure 6:
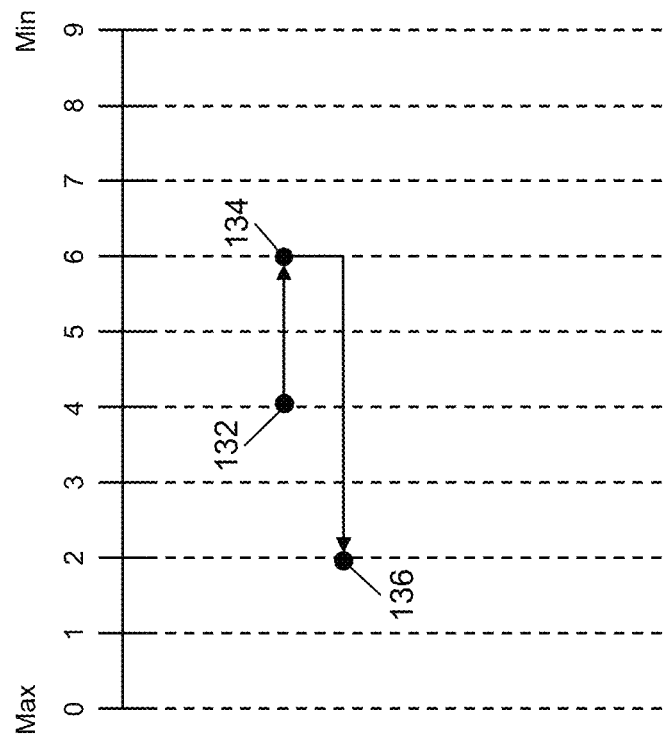
FIG. 6 is an exemplary diagram charting how the zoom method of FIG. 5 to incorporate a code where the code does not contain equivalent sequential characters.

FIG. 6 shows how the zoom function of a camera may be used to incorporate the code "462." The verification system 5 first moves the camera's zoom to point 132, which represents the number "4." Next, the system moves the camera's zoom to point 134, which represents the number "6." The system then moves the camera's zoom to point 136, which represents the number "2." To ensure that the number is correctly incorporated, the zoom may stop on each number for a set period of time.

Figure 7:
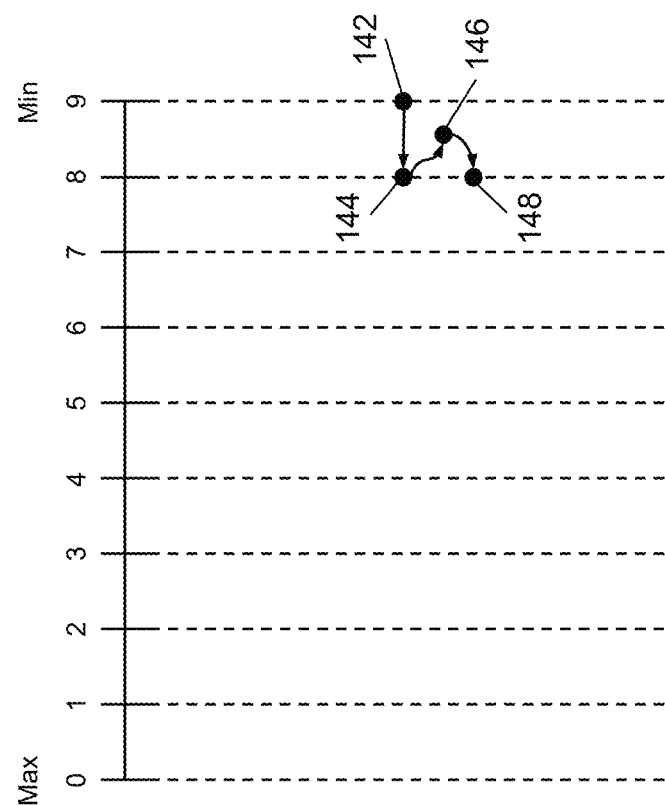
FIG. 7 is an exemplary diagram charting how the zoom method of FIG. 5 to incorporate a code where the code does contain equivalent sequential characters.

FIG. 7 shows how the zoom function may be used to incorporate a code wherein the code includes two equal digits that are next to each other, such as "988". In this scenario, the verification system 5 may first move the camera's zoom to point 142, which represents the number "9." Next, the verification system 5 may move the camera's zoom to point 144, which represents the number "8." The system may move the camera's zoom to point 146, which is in between the point 142 and 144. Point 146 does not represent any number. Next, the verification system may move the camera's zoom back to point 148 to incorporate the number "8." Similar to the method illustrated in FIG. 4, to ensure that each number is correctly incorporated, the zoom may stop on each number for a set period of time.

Figure 8:
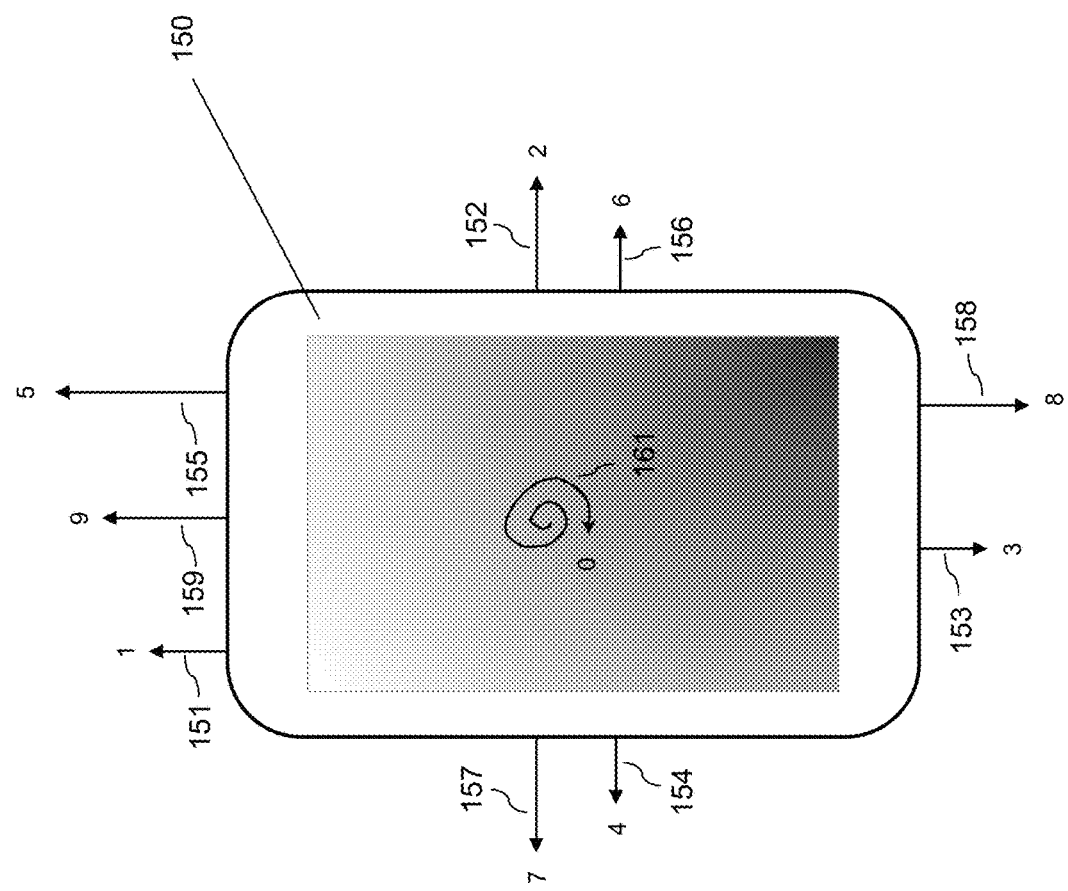
FIG. 8 is an exemplary diagram charting how a user can move a recording device in certain directions in order to incorporate a code.

FIG. 8 illustrates how a user may move the recording device 150 in specific directions to incorporate a code into a recording. Each movement represents both a distance, which may be measured in time, and direction. If the user generates a movement 151, the number "1" may be incorporated into the recording. If the user generates a movement 152, the number "2" may be incorporated into the recording. If the user generates a movement 153, the number "3" may be incorporated into the recording. If the user generates a movement 154, the number "4" may be incorporated into the recording. If the user generates a movement 155, the number "5" may be incorporated into the recording. If the user generates a movement 156, the number "6" may be incorporated into the recording. If the user generates a movement 157, the number "7" may be incorporated into the recording. If the user generates a movement 158, the number "8" may be incorporated into the recording. If the user generates a movement 159, the number "9" may be incorporated into the recording. If the user generates a movement 161, the number "0" may be incorporated into the recording.

Figure 9:
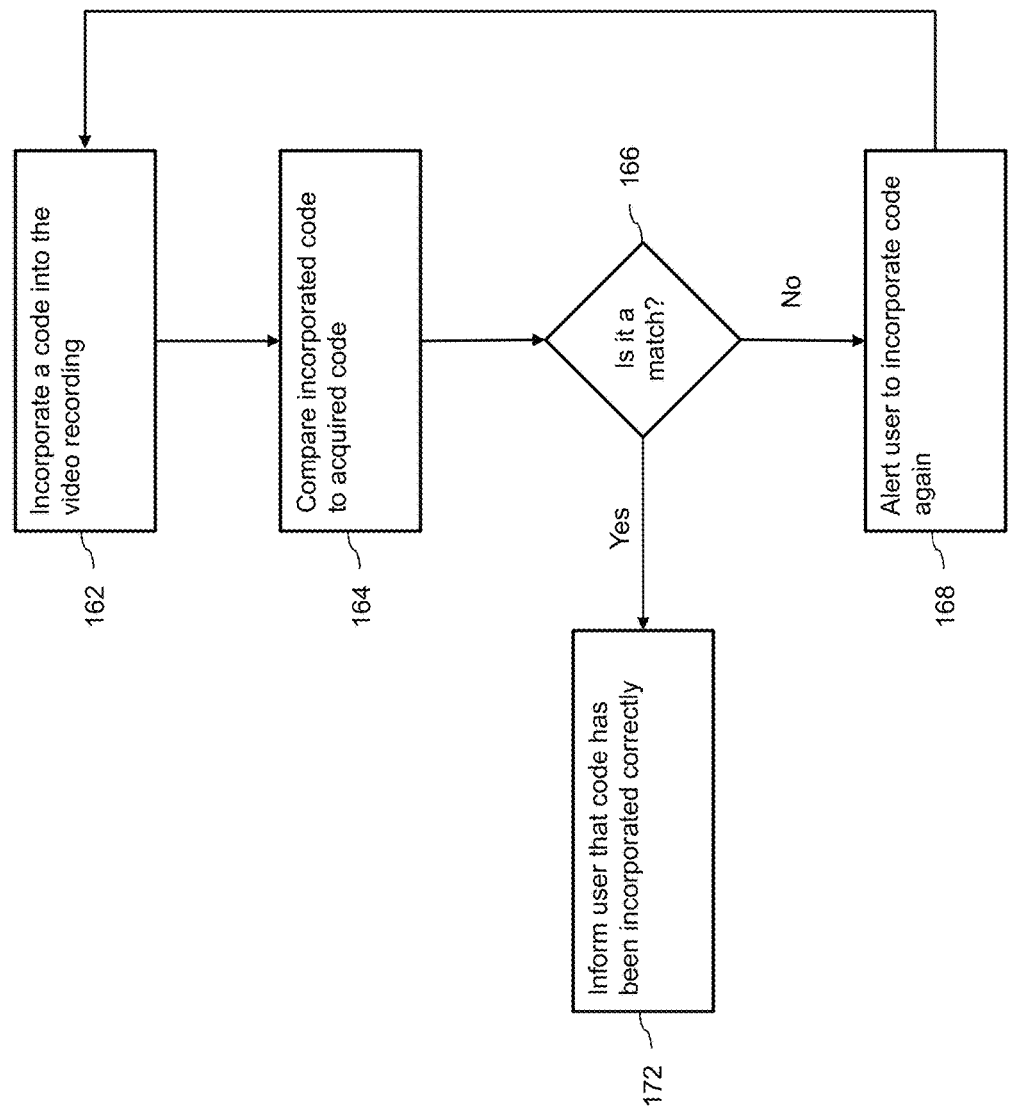
FIG. 9 is an exemplary flowchart on how the verification system of FIG. 1 may ensure that the correct code has been incorporated into a video recording.

FIG. 9 illustrates an exemplary flowchart on how the verification system 5 may verify that the correct code has been incorporated into a recording. First, at step 162, the acquired code may be incorporated into the recording. Next, at step 164, the incorporated code may be compared to the acquired code. At step 166, if the codes are a matched, at step 172 the verification system 5 may inform the user that the code was incorporated correctly. At step 166, if the codes are not a match, at step 168 the verification system 5 may alert the user that they must incorporate the code again. Additionally, the verification system 5 may determine if a new code has been generated. In the event that a new code is being broadcast, the verification system will acquire the new code and incorporate this code into the recording.

Figure 10:
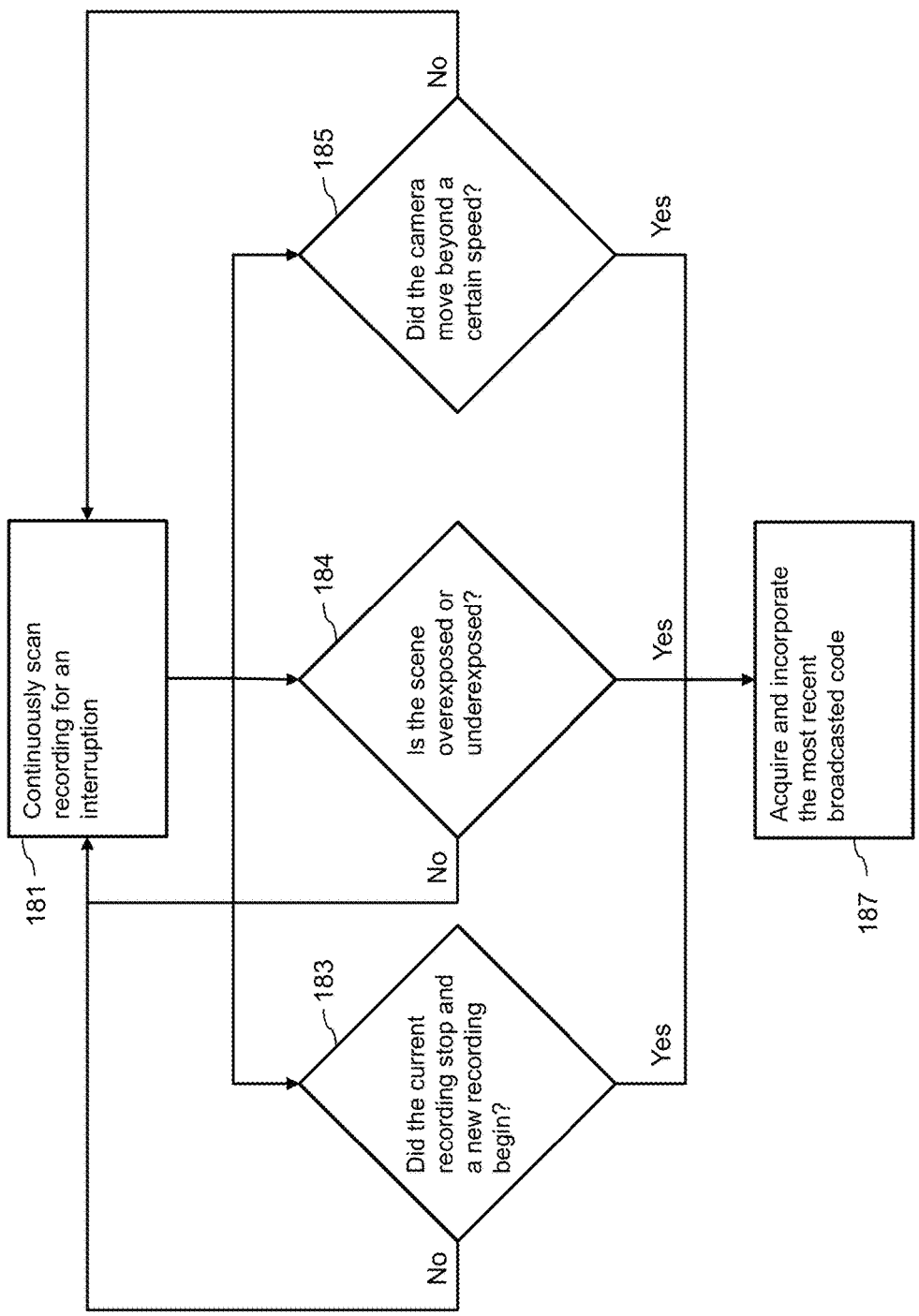
FIG. 10 is an exemplary flowchart on how the verification system of FIG. 1 may detect interruptions in the video recording.

FIG. 10 illustrates an exemplary flowchart on how the verification system 5 may detect an interruption in the recording. At step 182, the verification system 5 continuously scans the live recording for an interruption. The verification system 5 may detect an interruption if one of three events occurs. In scenario 183, the verification system 5 may determine whether the current recording has stopped and a new recording began. In scenario 184, the verification system 5 may determine whether the scene has become overexposed or underexposed. In scenario 185, the verification system 5 may determine if the camera moved beyond a certain speed. If any of the scenario's 184, 185, or 186 results in an affirmative, the verification system 5 moves to step 187, wherein it acquires and incorporates the most recent broadcasted code. Alternatively, if any of the scenario's 184, 185, or 186 do not occur, then the verification system 5 continues to scan for an interruption. The thresholds for over and underexposure can be determined based on the setting of shooting, time of shooting, type of camera among other parameters, but generally whenever there is more than 90% color uniformity of pixel calculation then an interruption has occurred. Likewise gyroscopes and position sensors in the device can be used to detect extreme moments of device and interruption has occurred.

Figure 11:
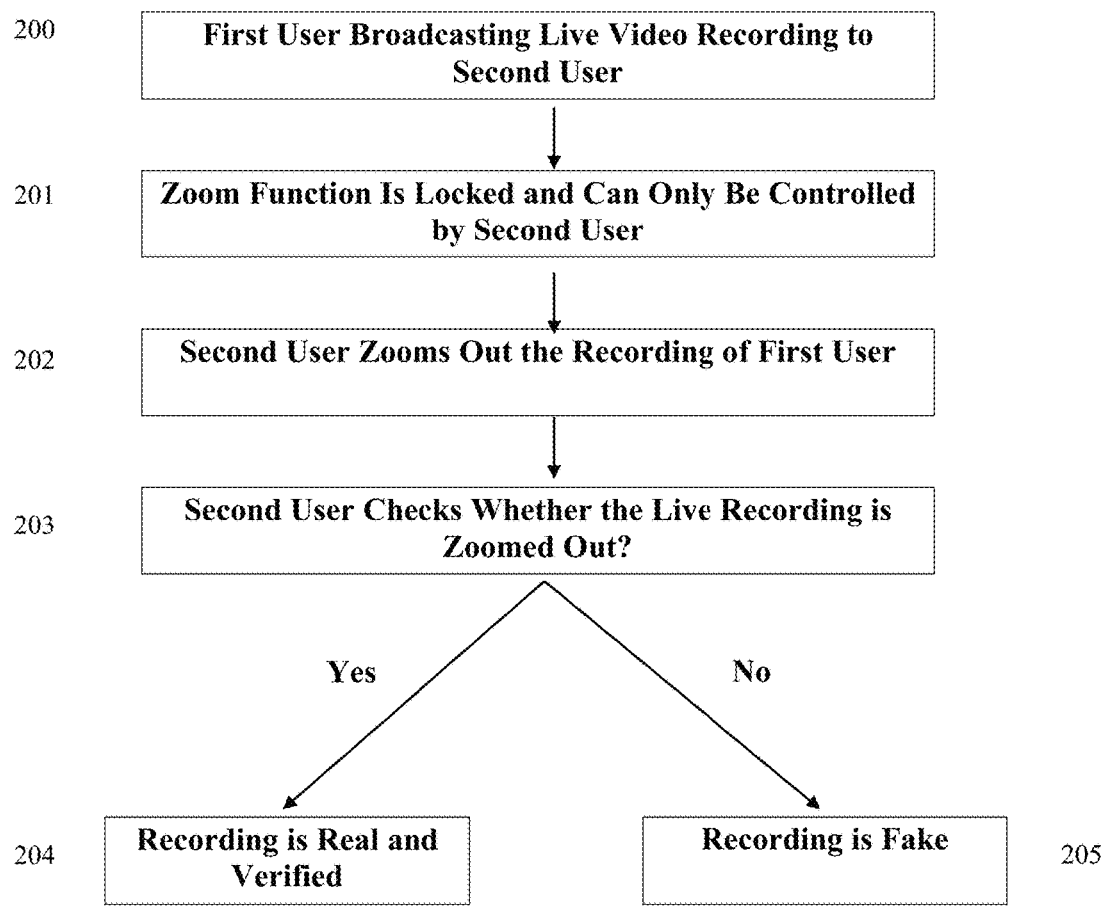
FIG. 11 is an exemplary flowchart on how the verification system of FIG. 1 may detect a recording is fake using a zoom function.

FIG. 11 is another example of a verification system 5. As shown in FIG. 11, a first user live streams a video recording to a second user, in step 200. As a result, the live broadcast is available and displayed to second user. In this example, one or more of the first user's camera's functions is controlled by the second user. For example, the second user can control the zoom function of the first user's camera at any time. This is accomplished by providing the second user with real time access to the first user's camera via the connection, where the zoom function is locked on the first user's camera and can only be accessed by the second user (step 201) or is functional on the first user's camera, but can be overridden by second user at any time. If locked, that means the recording can never be zoomed in or out unless the second user chooses to. If not locked and the zooming function is controlled automatically or manually by the first user, the second user can temporarily disable the first user's control when the second user chooses to control the zoom function. In that scenario, the zoom function can only be controlled by second user for that period of time, and after the second user stops zooming the camera of the first user, the zooming function return to its original state to be controlled by the first user.

The system 5 can be used for verifying the originality of the recording and assuring that it is in fact a live recording, since the second user is viewing what is supposed to be a live recording, and if the second user sends a command to zoom out three degrees (step 202), the second user should be able to view a zooming out by three degrees in the live video (step 203). The changes should be seen immediately; any lag should be within the range of normal connection delays. If so, the video is confirmed authentic (step 204). Any deviation from the expected modification of the live video feed is an indication the video is not an authentic live video (step 205). Any function related to camera recording that imparts an observable change to the recordings characteristics like zooming, focusing, using a light, or even introducing auditory or vibratory changes, etc. can be used to confirm the authenticity of the live video in a process similar to that shown in the flow chart shown in FIG. 11. In the example shown in FIG. 11, the step of checking whether the recoding did indeed respond to the command (step 203), in this example zooming out three degrees, can be accomplished either manually or automatically. If needed, and for further verifying the recording, the commands can be sent repeatedly and automatically checked immediately as they are being sent in the recording. Preferably, the changing function should bring about as visually or audibly as subtle of a change as possible so that the change doesn't interfere with the recording. It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A verification system comprising:
    a code generation server generating time stamped codes; and
    a proving device, including a video camera, that acquires a the time stamped code from the code generation server, and, while recording a video, incorporates the acquired time stamped code into the video according to a predetermined algorithm;
    wherein the predetermined algorithm dictates a predefined instructions on how the time stamped codes are incorporated into the recording to produce a visual change into the recording by using one of the following functions of the camera, selected from, focusing, zooming, flash light or moving the camera through a predefined direction;
    wherein the proving device further determines a series of motions, each motion derived from a digit of the time stamped code, and prompts a user of the proving device to move the video camera through the series of motions using a user interface of the proving device; and
    wherein the verification system receives the video, extracts the time stamped code from the content of the video, compares the extracted time stamped code to the generated time stamped codes, and displays a verification of the recorded video.

2. The verification system of claim 1, wherein the code generation server derives the time stamped code from weather parameters.

3. The verification system of claim 1, wherein the code generation server derives the time stamped code from a price of a stock index.

4. The verification system of claim 1 wherein at least a portion of the video into which the time stamped code is incorporated is publicly published.

5. The verification system of claim 1 wherein at least a portion of the video is first hashed and then publicly published.

6. A verification system comprising:
    a code generation server generating time stamped codes; and
    a proving device, including a video camera, that acquires the time stamped code from the code generation server, and, while recording a video, incorporates the acquired time stamped code into the video according to a predetermined algorithm;

wherein the predetermined algorithm dictates a predefined instructions on how the time stamped codes are incorporated into the recording to produce a visual change into the recording by using one of the following functions of the camera, selected from, focusing, zooming, flash light or moving the camera through a predefined direction;

wherein the proving device determines a series of zoom positions, each zoom position corresponding to a digit of the time stamped code, and, while the video camera is actively recording, updates a zoom function of a camera lens of the camera according to the series of zoom positions; and wherein the verification system receives the video, extracts the time stamped code from the content of the video, compares the extracted time stamped code to the generated time stamped codes, and displays a verification of the recorded video.

7. The verification system of claim 6, wherein the video camera moves through the series of zoom positions from a maximum zoom to a minimum zoom, stopping at each of eight points between the maximum zoom and the minimum zoom.

8. The verification system of claim 6 wherein the speed at which zooming is performed signifies a particular code or value.

9. The verification system of claim 6 wherein a duration of zooming determines a specific predetermined time stamped code.

10. A verification system comprising:
a code generation server generating time stamped codes; and
a proving device, including a video camera, that acquires the time stamped code from the code generation server, and, while recording a video, incorporates the acquired time stamped code into the video according to a predetermined algorithm;

wherein the predetermined algorithm dictates a predefined instructions on how the time stamped codes are incorporated into the recording to produce a visual change into the recording by using one of the following functions of the camera, selected from, focusing, zooming, flash light or moving the camera through a predefined direction;

wherein the proving device determines a series of zoom positions, each zoom position corresponding to a digit of a base numeric system, and, while the video camera is actively recording, updates a zoom function of a camera lens of the camera according to the series of zoom positions; and wherein the verification system receives the video, extracts the time stamped code from the content of the video, compares the extracted time stamped code to the generated time stamped codes, and displays a verification of the recorded video.

11. A method for verifying a recording comprising the steps of:
generating a series of time stamped codes using a code generation server;
recording a video in a proving device;
acquiring a the time stamped code in the proving device;
incorporating the acquired time stamped code into the video according to a predetermined algorithm;
wherein the predetermined algorithm dictates a predefined instructions on how the time stamped codes are incorporated into the recording to produce a visual change into the recording by using one of the following functions of the camera, selected from, focusing, zooming, flash light or moving the camera through a predefined direction;
wherein the proving device further determines a series of motions, each motion derived from a digit of the time stamped code, and prompts a user of the proving device to move the video camera through the series of motions using a user interface of the proving device;
wherein the proving device determines a series of zoom positions, each zoom position corresponding to a digit of the time stamped code, and, while the video camera is actively recording, updates a zoom function of a camera lens of the camera according to the series of zoom positions; and
wherein the proving device determines a series of zoom positions, each zoom position corresponding to a digit of a base numeric system, and, while the video camera is actively recording, updates a zoom function of a camera lens of the camera according to the series of zoom positions;
receiving the video including the time stamped code in a verifying device;
extracting the time stamped code from the content of the video;
comparing the extracted time stamped code to the generated time stamped codes; and
displaying a verification of the video.

12. The method of claim 11, wherein the code generation server derives the time stamped code from weather parameters.

13. The method of claim 11, wherein the code generation server derives the time stamped code from a price of a stock index.

* * * * *